Nov. 2, 1965   G. D. STORM   3,215,391
POSITIONING DEVICE CONTINUOUS IN AZIMUTH AND ELEVATION
USING MULTIPLE LINEAR DRIVES
Filed June 29, 1964   3 Sheets-Sheet 1

INVENTOR.
GEORGE D. STORM
BY
Moody & Anderson
AGENTS

INVENTOR.
GEORGE D. STORM

BY Moody & Anderson
AGENTS

Nov. 2, 1965     G. D. STORM     3,215,391
POSITIONING DEVICE CONTINUOUS IN AZIMUTH AND ELEVATION
USING MULTIPLE LINEAR DRIVES
Filed June 29, 1964     3 Sheets-Sheet 3

INVENTOR.
GEORGE D. STORM
BY
*Moody & Anderson*
AGENTS

United States Patent Office 3,215,391
Patented Nov. 2, 1965

3,215,391
POSITIONING DEVICE CONTINUOUS IN AZIMUTH AND ELEVATION USING MULTIPLE LINEAR DRIVES
George D. Storm, Dallas, Tex., assignor to Collins Radio Company, Cedar Rapids, Iowa, a corporation of Iowa
Filed June 29, 1964, Ser. No. 378,845
7 Claims. (Cl. 248—396)

This invention relates generally to positioning devices and more particularly to a suspension concept as between a base plane and a mounting plane which permits continuous positioning of the mounting plane with respect to the base plane in azimuth and elevation in response to linear motion inputs.

The present invention is especially useful as a structural mount for positioning an antenna or other bore-sighted device whereby the device may be positioned in azimuth and elevation in a continuous manner in response to linear motion inputs.

Considering the present invention as it might apply to antenna positioning systems, and bearing in mind that the invention is not limited to such an application but may find especial usage for this purpose, the present invention will be described primarily as it would apply to an antenna positioning embodiment. The invention basically is that of effecting the orientation of one plane with respect to another. As the invention applies to the antenna art it might be stated that a first plane may be caused to be positioned continuously in azimuth and elevation with respect to a fixed base plane by utilizing linear motion inputs.

Known positioning systems generally incorporate a rotating base mount for positioning in azimuth along with a yoke and further drive arrangement fixed to the rotating base to tilt the mounting plane in elevation. By this means the mounting plane, or a device affixed thereto, such as an antenna, may be oriented in azimuth and elevation with respect to a fixed base mount by providing rotational inputs to each of the two drives. These types of positioning systems in general tend to be bulky and necessitate the use of costly azimuth bearings when the device to be positioned is of considerable weight. Further, in known systems, the rotational inputs require expensive gearing to effect accurate positioning in each of the two planes.

An object, therefore, of the present invention is the provision of a suspension and positioning system by means of which a first plane may be continuously oriented with respect to a fixed base plane by means permitting the elimination of conventional rotational mounts and rotational inputs, by effecting orientation in response to linear motion inputs.

A further object of the present invention is the provision of a simplified positioning system, the manufacturing requirements for which are eased due to elimination of slip rings, rotary joints, costly bearings, precision gearing and other components which tend to increase system cost and complexity without necessarily providing a proportional advantage in utility or accuracy.

A further object of the present invention is a provision of a positioning system capable of positioning an antenna or other device in elevation and azimuth wherein elevation travel is not limited at the zenith position and wherein azimuth travel may be continuous.

A still further object of the present invention is the provision of a positioning system permitting continuous orientation of a mounting plane with respect to a base plane in elevation and azimuth and wherein a pointing axis passing through and normal to the mounting plane may be caused to pass through any point on a hemisphere whose base is parallel to the base mounting plane and passes through the geometric center of the suspension points associated with the mounting plane.

A still further object of the present invention is the provision of a suspension and positioning system employing linear drive inputs by means of which a pointing axis normal to the positioned plane may be made to pass through any point in an area exceeding a hemisphere and approaching a sphere, the base of which is parallel to the base plane and passes through the geometric center of the suspension points associated with the mounting plane.

The invention is featured in the provision of multiple pairs of linear drive means operatively connected to a base plane and a mounting plane, each of said drive means comprising a pair of linear drive units affixed commonly to a flexible coupling and each individually to one of the mounting and base planes respectively. The mounting plane is oriented with respect to the base plane by causing certain ones or combinations of ones of the linear drive pairs to be simultaneously lengthened or foreshortened to effect a change in the mounting linkage geometry which causes the mounting plane to assume a different orientation with respect to the base plane for each different permutation of mounting linkage lengths, each linkage being a predetermined function of linear input motion applied to the linear drive pair associated therewith.

These and other objects and features of the present invention will become apparent from reading the following description in conjunction with the accompanying drawings in which.

Figure 1:
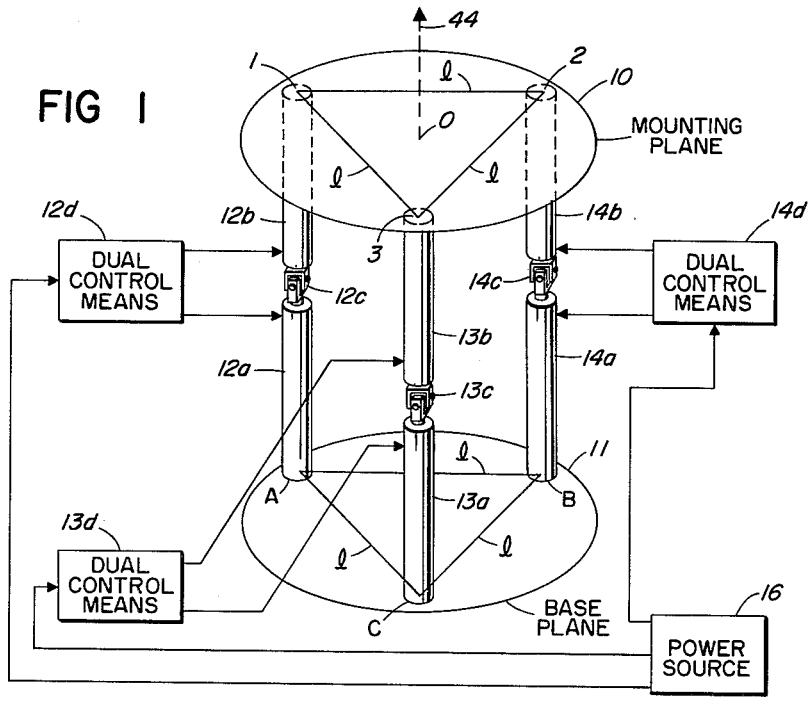
FIGURE 1 is an electromechanical functional diagram of the invention.

The present invention resides in a suspension concept and embodiments thereof by which a device may be mounted with respect to a base plane and oriented in azimuth and elevation with respect to the base plane. The terms "azimuth and elevation," while pertaining to geographic orientation, are not intended to impose such limitation on the invention but are used to described the positioning system of this invention in familiar terms as concerns antenna orientation.

The positioning device of this invention comprises a multipoint suspension between a base plane and a mounting plane which permits substantially unlimited orientation of the mounting plane with respect to the base by utilizing a mounting geometry comprised of variable length suspension arms. The comparative lengths of the suspension arms may be adjusted to position the mounting plane in azimuth and elevation throughout an operating (pointing) range which may approach a sphere.

The suspension and positioning device of the present invention might basically be defined as suspension arms the ends of which are affixed respectively to the base and mounting planes. Each of these suspension arms is comprised of a pair of linear drive units separated by, and coupled one to the other, by means of a flexible coupling joint. The term "linear drive unit" as used herein refers to any arm-like device capable of being lengthened or foreshortened along its longitudinal axis. In accordance with the invention, each of the linear drive units comprising the pair associated with a given suspension arm, is caused to be simultaneously lengthened or foreshortened by the same extent and in the same direction. Responsive to a predetermined lengthening or foreshortening of the linear drive unit pairs in the various arms, the geometry of the suspension system dictates predetermined orientation of the mounting plane with respect to the base. As will be further described, the invention utilizes at least three suspension arms of which at least two are comprised of linear drive unit pairs. In this manner, the three or more suspension points on the base and mounting planes lie in and respectively define these planes. In essence then, it might be stated that the present invention causes three points lying in a mounting plane to be oriented in space as a function of the relative lengths of the suspension arms associated therewith. A device affixed to the mounting plane is thereby caused to be pointed or oriented in azimuth and elevation as a function of the relative lengths of the arms forming the three point suspension and therefore, as a function of the relative lengths of the linear drive units comprising each of the arms. In accordance with the present invention, unlimited freedom of movement of the mounting plane is permitted by constructing each of the suspension arms as a pair of linear drive units separated by a flexible coupling. The positioning is limited only by mechanical interference between the base and mounting planes and the practical lengths of the linear drive units.

The operative principle of the present invention may be defined by reference to the diagram of FIGURE 1 wherein the base plane heretofore described is illustrated as a plane surface 11 and the mounting plane, which is to be positioned with respect to the base plane 11, is illustrated as a plane surface 10. The mounting plane 10 is defined by three suspension points, 1, 2, and 3, which in the illustrated embodiment, lie at the corners of an equilateral triangle, the sides of which are of lengths "*l*." The base plane 11 is similarly defined by three suspension points A, B, and C. The mounting and base planes are represented in FIGURE 1 as discs containing these suspension points. As illustrated in FIGURE 1, the mounting plane 10 and base plane 11 are parallel to one another. A linear drive element 12a is affixed to the base plane 1 at suspension point A and coupled through a flexible coupling means 12c to a like linear drive unit 12b the end of which is affixed to suspension point "1" on mounting plane 10. In like manner, a linear drive unit 13a is affixed to suspension point C on base plane 11 and joined to a like linear drive unit 13b through flexible coupling 13c. A further linear drive unit 14a is affixed to suspension point B on base plane 11 and coupled through flexible coupling 14c to a like linear drive unit 14b associated with the mounting plane 10.

Three suspension arms are thus illustrated in FIGURE 1, each comprised of a pair of linear drive units affixed respectively to the base and mounting planes and mutually coupled by means of an associated flexible coupling member. The linear drive units may take a variety of forms embodiments of which will be further discussed.

For the purpose of describing the operational aspects of the invention it may suffice to consider that each of the linear drive units shown is comprised of a cylinder and piston arrangement wherein the position of the piston within the cylinder is controllable. Thus, FIGURE 1 functionally illustrates a dual control means 12d associated with each of the pair of coacting linear drive units 12a and 12b. For the purpose of explanation, let it be assumed that the dual control means 12d applies power from power source 16 to each of the linear drive units 12a and 12b so as to cause units 12a and 12b to simultaneously lengthen or foreshorten for a period of time during which power from source 16 may be applied thereto. In a similar manner, dual control means 13a is shown associated with linear drive units 13a and 13b to control the application of power from source 16 to this drive unit pair. A further dual control means 14d is connected to the pair of linear drive arms 14a and 14b so as to control the application of power from source 16 thereto.

Figure 2:
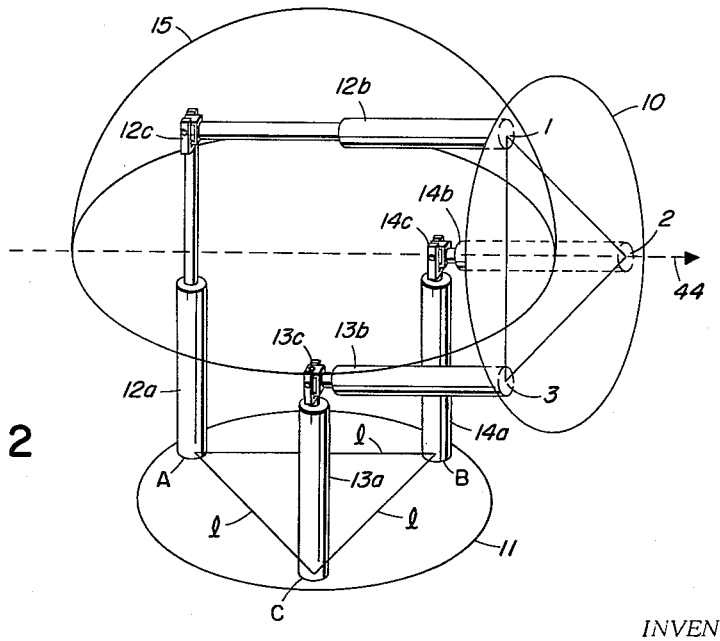
FIGURE 2 is a further diagrammatic representation of the mounting means of the invention showing the mounting plane positioned normal to the base plane.

To describe the action of the mount, a pointing axis 44 is illustrated in FIGURE 1 as a line perpendicular to the mounting plane 10 and passing through the center point "O" of the mounting plane. The linear drives 12a, 12b, 13a, 13b, 14a and 14b are shown in their fully retracted positions such that the suspension arms formed by the various drive pairs are of the shortest possible length. Now, by extending the linear drive units, the orientation of the mounting plane 10 with respect to base plane 11 may be altered. The linear drive units operate in pairs, the pairs being defined as the units such as 12a and 12b, which are joined commonly to a flexible coupling such as 12c. In operation each pair of linear drive units may be extended in length or retracted separately. However, each drive unit of a given pair must be extended (or retracted) by the same increment as its mate. By separately varying the combined stroke of each pair of linear drive units up to a maximum spacing of 2*l*, the pointing axis 4 may be made to pass through any point on a hemisphere whose base is parallel to the plane 11 and passes through the center point "O" of the mounting plane 11. FIGURE 2 illustrates a particular orientation wherein drive units 12a and 12b are extended by a length *l* such that that combined stroke is increased by 2*l*. For the particular orientation of FIGURE 2, it is noted that the linear drive units pairs 13a–13b and 14a–14b have remained in their fully retracted position while the flexible couplings 12c and 14c have permitted the expansion of the drive units 12a and 12b. The suspension geometry causes a tilt of the mounted plane 10 by 90° in elevation from the vertical position depicted in FIGURE 1.

Figure 3:
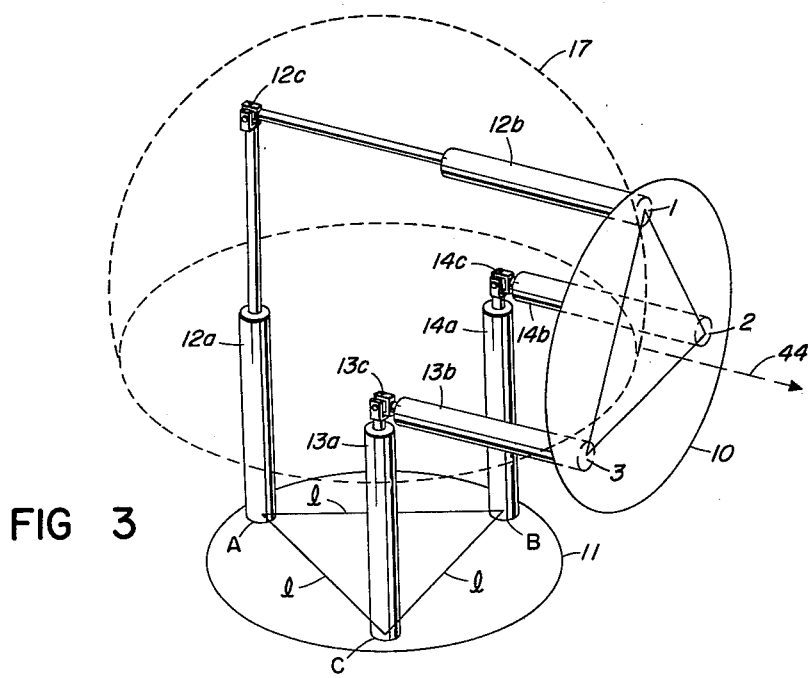
FIGURE 3 is a still further diagrammatic representation of the mounting means of the invention.

For every particular orientation of the mounting plane 10 with respect to the base plane 11 there is a permutation of lengths of the linear drive pairs which corresponds to the position. The operation might then be described as a particular permutation of lengths of various drive units which necessarily will result from a particular orientation of mounting plane 10, or alternately, as a predetermined position of the mounting plane 10 with respect to base plane 11 which must necessarily result from the particular permutation of drive unit lengths effected. By increasing the combined stroke of the linear drive units of each of the pairs to a length which is greater than 2*l*, the point axis 44 may be made to be positioned throughout an area exceeding a hemisphere. Such a condition is depicted in FIGURE 3 wherein a similar azimuth orientation is depicted but wherein the elevation of the mounting plane 10 is such that the mounting plane goes beyond the point where it is normal to the base plane 11. The orientation is possible by choosing linear drive units such that the combined stroke of a given pair may exceed 2*l*, where *l* is the distance between suspension points 1, 2, 3 and A, B, C on the mounting and base planes respectively.

Figure 4:
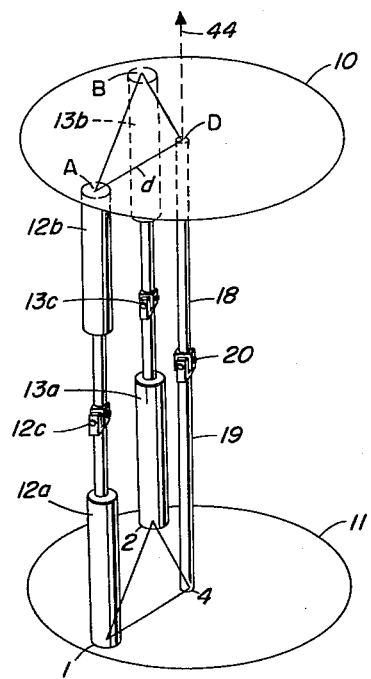
FIGURE 4 is a digrammatic representation of a further embodiment of the invention.

The invention has thus far been described in terms of an embodiment employing three suspension arms each of which is comprised of a pair of linear drive units separated by a flexible coupling member. In accordance with the present invention, the same motion may be accomplished utilizing but two pairs of linear drives and substituting a fixed pivot point for the third pair. Reference is made to FIGURE 4 which illustrates the mounting plane 10 and base plane 11 being mutually suspended by means of a pair of linear drive units 12a and 12b through flexible coupling 12c, a second pair of linear drive units 13a and 13b separated by a flexible coupling 13c and a third suspension arm comprised of rigid mounting elements 18 and 19. Elements 18 and 19 are affixed respectively to the mounting plane 10 at point D and to the base plane 11 at point 4 so as to be co-extensive with the pointing axis 44 of the mounting plane 10. The mounting elements 18 and 19 are fixed in length as defined by the minimum length of the linear drive units plus $d/2$, where $d$ is the distance between each of the drive unit suspension points and that associated with the fixed length elements. A flexible coupling 20 joins arms 18 and 19 such that it defines, in conjunction with flexible coupling means 12c and 13c, a plane parallel to the mounting plane 10 and base plane 11 when the linear drive units are extended a length $d/2$ from their fully retracted position. For hemispherical coverage, this extension represents one-half the extension capability. For coverage exceeding a hemisphere, the extension would be less than one-half the extension capability. The arrangement of FIGURE 4 permits orientation of mounting plane 10 by particular permutations of lengths of the arms comprising the linear drive unit pairs. The orientation of mounting plane 10 is again a function of the combined stroke of the linear drive unit pairs.

Figure 5:
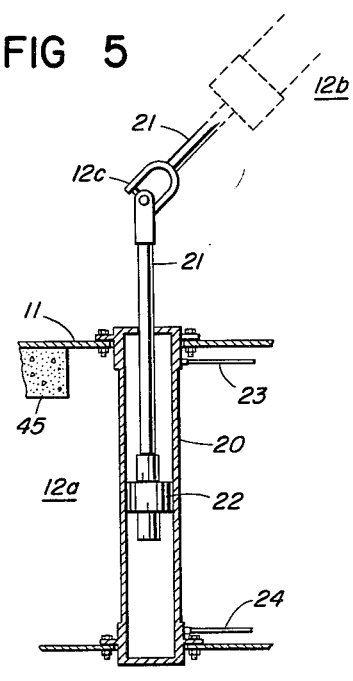
FIGURES 5, 6 and 7 illustrate mechanical embodiments of types of linear drive units which may be employed in an embodiment of the invention.
Figure 6:
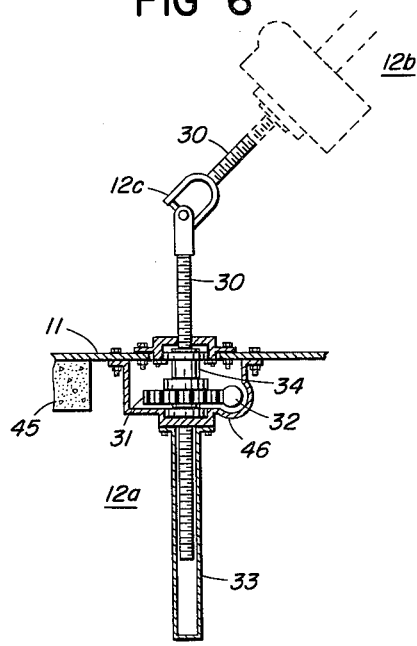
Figure 7:
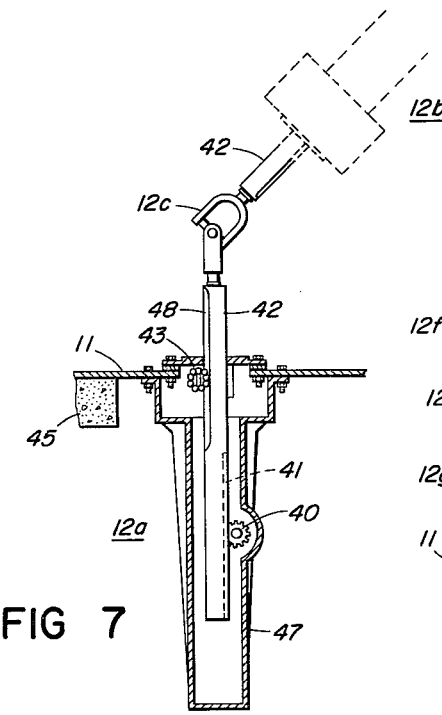

Types of linear drive units which might be used to embody the present invention are illustrated in FIGURES 5, 6, and 7. FIGURE 5 illustrates a type of drive unit which may be either pneumatically or hydraulically controlled. The unit is comprised of a cylinder member 20 within which a piston 22 is received. A piston arm 21 extends axially from the cylinder 20. The unit depicted in FIGURE 5 shows in detail a structure which might comprise the base plane connected drive unit such as unit 12a in FIGURES 1, 2 and 3. The base plane 11 is defined as a mounting plate which may be anchored to a concrete pedestal 45 as illustrated. The position of the piston 22 within the cylinder 20 may be controlled by fluid pressure in the pressure lines 23 and 24. A second like unit is illustrated in phantom lines as the unit corresponding to the paired drive unit 12b. Unit 12b is connected to unit 12a by means of flexible coupling 12c which may be in the form of a universal joint as illustrated. It is to be understood that in accordance with the principles of the invention, the pressure lines 23 and 24 associated with cylinders 20 for each of the drive units 12a and 12b would be connected to a dual control means such that the stroke of the two pistons is simultaneously controlled in the same direction and by the same amount. Since such a control means is believed to be well within the state of the art the description here will not define in detail such a control.

FIGURE 6 represents a further type of drive unit embodiment which may be employed. FIGURE 6 represents an embodiment employing a jack screw principle. A worm gear 31 in threaded engagement with a jack screw 30 is rotatably confined within a gear housing 46 which is rigidly affixed to the base mounting plane 11. Worm gear 31 is positioned by a worm drive 32, the latter being controlled in rotation by means of a motor (not illustrated). The jack screw 30 may be enclosed in a dust cover member 33. With this arrangement, drive from the worm drive 32 rotates worm gear 31 which is constrained against axial displacement and thereby causes jack screw 30 to be axially displaced with respect to the worm gear 31. The direction of translation of jack screw 30 with respect to the mounting plane is defined by the direction of rotation of the worm drive 32. The drive means for the worm drive 32 may be either electric, pneumatic or hydraulic. As in the embodiment of FIGURE 5, the drive unit depicted in FIGURE 6 comprises a second like arrangement 12b shown in phantom lines. Arms 30 of each of the drives 12a and 12b are coupled by means of a flexible coupling 12c which again is illustrated in the form of a universal joint.

A still further embodiment of the linear drive units is depicted in FIGURE 7 which operates on a rack and pinion principle. The housing 47 for the unit is rigidly affixed to the base mounting plane 11 which might be a plate member joined to a concrete pedestal 45. The actuating rod 42 is formed with a rack gear 41 which cooperates with a pinion drive 40. The actuating rod 42 is constrained from rotation by means of a bearing member 43 riding in a keyway 48 formed in rod member 42. The pinion drive 40 may then be driven by means of an electrical, pneumatic or hydraulic control system. As in the above described embodiments, a second like configuration 12b has an actuating rod 42 coupled by means of a flexible coupling 12c in the form of a universal joint.

Each of the linear drive configurations shown in FIGURES 5, 6, and 7 permits the adjustment of the stroke of a piston-like device. Two such devices are coupled "back-to-back" to form the suspension arms of the invention.

Figure 8:
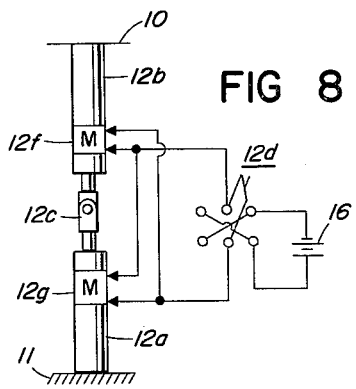
FIGURE 8 is a functional schematic representation of a control means for a pair of linear drive units in accordance with the principle of the invention.

With reference again to FIGURE 1, each of the drive unit pairs such as 12a and 12b is under the control of a dual control means such as 12d whose function it is to control the application of power from a source 16 to the drive units in the given pair so as to simultaneously foreshorten or lengthen the units of a given pair. FIGURE 8 illustrates, in a functional schematic, a simple type of control by means of which the drive unit of FIGURE 6 or 7 might be controlled in accordance with the invention. Dual control means 12d is seen to be comprised of a double-pole, double-throw switch which functions to connect in one polarization or the other an electrical power source 16 to motors 12g and 12f (associated with linear drive unit 12a and 12b), respectively. The arrangement is symmetrical in nature and the first position of the switch connects the power source 16 to each of the motors so as to cause a direction of rotation tending to drive the actuating rods of the units out of the cylinders. The second position of the switch correspondingly connects the power source 16 to the motors with opposite polarity such that the reverse motor rotations cause a retraction or foreshortening of the associated drive units. Although not specifically illustrated, the motors 12g and 12f of FIGURE 8 might be connected to the worm drive 32 of FIGURE 6 or pinion drive 40 of FIGURE 7. Although not specifically illustrated or described herein, it is contemplated that numerous mechanical and hydraulic control systems, well within the state of the art, may be utilized to control drive units such as shown in FIGURES 5, 6, and 7 in a dual fashion as described herein.

Although this invention has been described with respect to a particular embodiment thereof, it is not to be so limited as changes might be made therein which fall within the scope of the invention as defined in the appended claims.

I claim:

1. Means for mounting a device with respect to a base member, said device being selectively positionable with respect to said base member, comprising at least three suspension points associated with said device and a like number of suspension points associated with said base member, at least three suspension arms the ends of which are rigidly affixed to one of the suspension points associated with said device and said base respectively, each of said suspension arms comprising first and second like mounting members mutually coupled by a flexible coupling member, and said first and second mounting members associated with at least two of said suspension arms being selectively adjustable in length.

2. A mounting means as defined in claim 1 wherein said adjustable mounting members comprise like linear-drive units each having associated therewith control means for effecting a selected length thereof, said control means being adapted to simultaneously effect equal and adjustable lengths of the linear-drive units associated with any one of said suspension arms.

3. A mounting means as defined in claim 2 wherein two of said suspension arms are each comprised of a pair of said linear drive units and a third one of said suspension arms comprises first and second fixed-length mounting arms, said first and second fixed-length mounting arms having first ends thereof affixed to suspension points on said mounted device and base mounting means respectively, the other ends of said fixed-length mounting arms being joined by a flexible coupling.

4. A mounting means as defined in claim 3 wherein the suspension points associated with said mounted device lie in and define a first plane, the suspension points associated with said base member lie in and define a second plane, and the flexible coupling members associated with said first, second and third suspension arms lying in and defining a third plane which parallels said first and second planes when the linear drive units associated with said first and second suspensions arms are extended from their minimum lengths by one-half the distance between the suspension points associated with the linear drive units and those associated with said fixed-length mounting arms.

5. Mounting means as defined in claim 1 wherein said suspension points are three in number and lie at the respective apexes of an equilateral triangle, each of said mounting members being adapted to expand in length from a minimum length thereof to a distance at least as the distances between said suspension points.

6. A mounting means as defined in claim 5 wherein each of the adjusted mounting members is comprised of a linear drive unit and has associated therewith a control means for effecting simultaneous like adjustment to its length and that of the associated one of said drive units.

7. A mounting means as defined in claim 5 wherein the adjustable ones of said mounting members are adapted to expand in length a distance in excess of the distance between said suspension points.

References Cited by the Examiner
UNITED STATES PATENTS 1,840,556    1/32    Arnold _____ 248—163

FOREIGN PATENTS 21,147    1891    Great Britain.
718,919    11/54    Great Britain.

CLAUDE A. LE ROY, *Primary Examiner.*